United States Patent
Omori et al.

(10) Patent No.: US 10,147,169 B2
(45) Date of Patent: Dec. 4, 2018

(54) IMAGE PROCESSING DEVICE AND PROGRAM

(71) Applicant: Sharp Kabushiki Kaisha, Sakai, Osaka (JP)

(72) Inventors: Keisuke Omori, Sakai (JP); Kei Tokui, Sakai (JP)

(73) Assignee: Sharp Kabushiki Kaisha, Sakai (JP)

( * ) Notice: Subject to any disclaimer, the term of this patent is extended or adjusted under 35 U.S.C. 154(b) by 0 days.

(21) Appl. No.: 15/522,428

(22) PCT Filed: Sep. 9, 2015

(86) PCT No.: PCT/JP2015/075536
§ 371 (c)(1),
(2) Date: Apr. 27, 2017

(87) PCT Pub. No.: WO2016/067762
PCT Pub. Date: May 6, 2016

(65) Prior Publication Data
US 2017/0330307 A1    Nov. 16, 2017

(30) Foreign Application Priority Data
Oct. 28, 2014    (JP) .................................. 2014-219328

(51) Int. Cl.
| G06T 5/00 | (2006.01) |
| G06T 7/529 | (2017.01) |
| H04N 5/232 | (2006.01) |
| H04N 5/235 | (2006.01) |
| G06T 5/50 | (2006.01) |
| G06T 7/571 | (2017.01) |

(52) U.S. Cl.
CPC ................ *G06T 5/002* (2013.01); *G06T 5/50* (2013.01); *G06T 7/529* (2017.01); *G06T 7/571* (2017.01); *H04N 5/2356* (2013.01); *H04N 5/23229* (2013.01); *G06T 2207/10148* (2013.01); *G06T 2207/20212* (2013.01)

(58) Field of Classification Search
CPC ...... G06T 5/002; G06T 7/529; H04N 5/23229
USPC ....................................................... 382/254
See application file for complete search history.

(56) References Cited

FOREIGN PATENT DOCUMENTS

JP        2008-294785 A    12/2008
WO    WO-2016067762 A1 *    5/2016    ............... G06T 5/00

* cited by examiner

*Primary Examiner* — Amandeep Saini
(74) *Attorney, Agent, or Firm* — Keating & Bennett, LLP

(57) ABSTRACT

Provided is an image processing device, including: a distance calculator that calculates distance information corresponding to at least one image among a plurality of input images; and an image generator that generates an output image with a shallow depth of field based on the distance information, in which the distance calculator calculates distance information from a plurality of contrast calculation regions sizes of which are different, and the image generator calculates a pixel value of an output image by smoothing a pixel value of the input image based on the distance information.

14 Claims, 18 Drawing Sheets

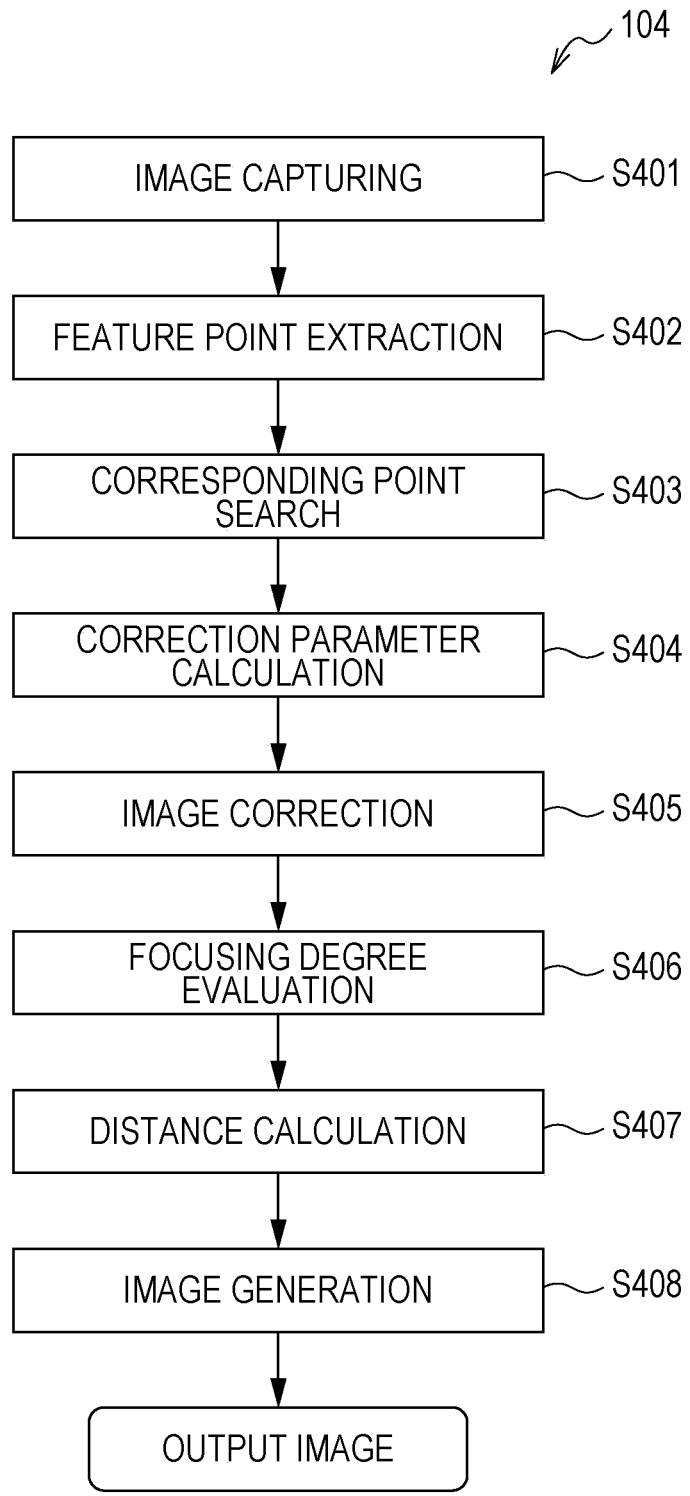

(A)

(B)  (C)  (D)

(A)

(B)  (C)  (D)

(A)

(B)

(C)

(A)

(B)

(A)

(B)

(C)

(A)

(B)

(C)

(D)

(A)

(B)

(C)

IMAGE PROCESSING DEVICE AND PROGRAM

TECHNICAL FIELD

The present invention relates to an image processing technique.

BACKGROUND ART

As one of the photographing techniques of a camera, there is a technique of capturing an image with a shallow depth of field to thereby capture an image in which only a narrow distance range is in focus, objects in front or rear thereof are blurred, and a specific object which is in focus is prominent. The longer a focal distance of a camera is, the shallower a depth of field is, and an image with a shallow depth of field is captured by using a single-lens reflex camera or the like.

On the other hand, a small-sized digital camera or a camera mounted on a smartphone has a small image sensor and a short focal distance, so that it is difficult to capture an image with a shallow depth of field.

Then, an image processing technique has been proposed by which an image with a shallow depth of field is generated on the basis of an image with a deep depth of field and distance information corresponding to the image. In PTL 1, a technique is described by which an image is divided into a plurality of regions, a distance to an object is calculated for each of the divided regions, and blurring processing is performed in accordance with the distance.

CITATION LIST

Patent Literature

PTL 1: Japanese Unexamined Patent Application Publication No. 2008-294785

SUMMARY OF INVENTION

Technical Problem

However, an image processing method described in PTL 1 has following problems.

FIG. 15(A) to FIG. 15(C) illustrate three images captured at different focus positions. In FIG. 15(A), an object (tree) 1501 in a close view is in focus, and an object (building) 1502 in a distant view is blurred. In FIG. 15(B), a middle position between the close view and the distant view is in focus, and both of the object in the close view and the object in the distant view are blurred to some extent. In FIG. 15(C), the object in the distant view is in focus, and the object in the close view is blurred.

In PTL 1, a method of calculating the distance to the object for each of the divided regions from intensity of high frequency components of a plurality of images at different focus positions as illustrated in FIG. 15(A) to FIG. 15(C) is described. FIG. 16(A) illustrates the same image as FIG. 15(A), and a region 1601 illustrated in FIG. 16(A) is one of divided regions. FIGS. 16(B), (C), and (D) are enlarged views respectively obtained at positions, which correspond to the region 1601, on the three images illustrated in FIG. 15(A) to FIG. 15(C). In comparison between FIGS. 16(B), (C), and (D), a high frequency component of FIG. 16(D) is the highest, so that it is possible to judge that FIG. 16(D) is a distant view. Accordingly, in a case of blurring the distant view to make a depth of field shallow, the region 1601 which has been judged to be the distant view is to be blurred. However, since the region 1601 includes not only the object 1502 in the distant view but also the object 1501 in the close view, when the region 1601 is blurred, the object in the close view is also blurred, thus causing an unnatural blur. In a case where the object in the close view and the object in the distant view are included in the divided region together as illustrated in FIG. 16, it is difficult to accurately calculate a distance to each object. In the case illustrated in FIG. 16, by reducing a size of each divided region, it is possible to reduce possibility of including a plurality of objects, whose distances are different, in one divided region, but the following problem is caused in a case where the size of the divided region is small.

FIG. 17(A) illustrates an image obtained by photographing an object 1701 in a distant view, and each of regions 1702 and 1703 illustrates a divided region. When a divided region is set to be large as the region 1702, the object 1701 in the distant view is included in the divided region also at a position apart from an edge of the object 1701 in the distant view, so that it is possible to judge that FIG. 17(A) is the distant view, thus making it possible to express a spread of a natural blur as illustrated in FIG. 17(B). On the other hand, when a divided region is set to be small as the region 1703, the object 1701 in the distant view is not included in the divided region at a position apart from the edge of the object 1701 in the distant view, and the divided region is a flat region, so that it is difficult to judge that FIG. 17(A) is the distant view. Thus, a boundary between a region which is to be judged to be the distant view and is to be blurred and a flat region becomes unnatural as illustrated in FIG. 17(C). That is, in a case where a distance is calculated for each divided region to thereby generate an image with a shallow depth of field, regardless of a size of the region, it is difficult to express a natural blur in some cases.

The invention is made in view of the aforementioned points, and an object thereof is to provide an image processing device capable of generating an image with a shallow depth of field, in which a natural blur is expressed.

Solution to Problem

The invention is made in order to solve the aforementioned problems, and is an image processing device that generates an image with a shallow depth of field, including: a distance calculator that calculates distance information corresponding to at least one image; and an image generator that generates an output image with a shallow depth of field based on the distance information, in which the distance calculator calculates distance information of a target pixel using at least one contrast calculation region among a plurality of contrast calculation regions sizes of which are different, each of the plurality of contrast calculation regions includes the target pixel, and the image generator calculates a pixel value of an output image by smoothing a pixel value of the input image based on the distance information.

The present specification includes the content disclosed in Japanese Patent Application No. 2014-219328 which is the base of the priority of the present application.

Advantageous Effects of Invention

According to the invention, it is possible to generate an image with a shallow depth of field, in which a natural blur is expressed.

BRIEF DESCRIPTION OF DRAWINGS

FIG. 4A is a flowchart illustrating a flow of image processing of generating an image with a shallow depth of field from a plurality of images which are captured at different focus positions.

DESCRIPTION OF EMBODIMENTS

First Embodiment

Figure 1:
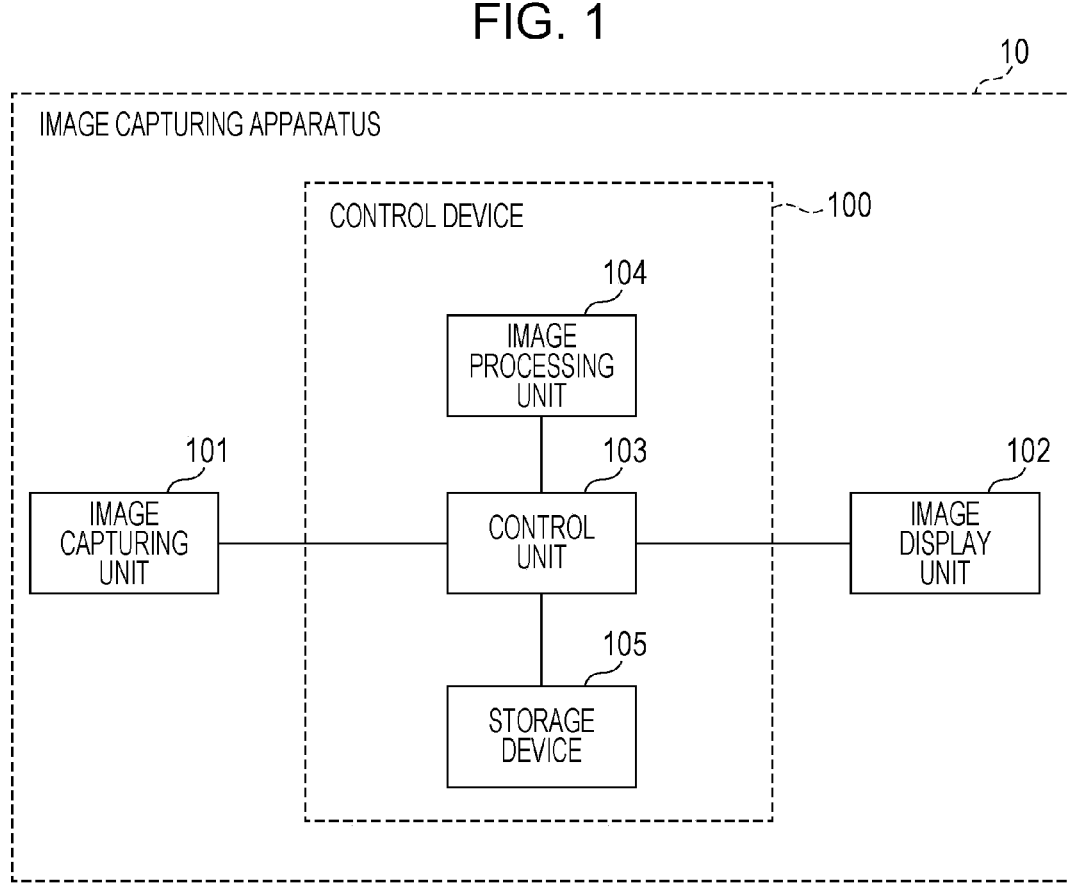
FIG. 1 is a functional block diagram illustrating a configuration example of an image capturing apparatus including an image processing device according to an embodiment of the invention.

Hereinafter, an embodiment of the invention will be described with reference to drawings. FIG. 1 is a functional block diagram illustrating a configuration example of an image capturing apparatus 10 including an image processing device (image processing unit 104) according to the present embodiment.

The image capturing apparatus 10 is configured to include a control device 100, an image capturing unit 101, and an image display unit 102.

The control device 100 is configured to include a control unit 103, the image processing unit 104, and a storage device 105.

The image capturing unit 101 is configured to include an image capturing device such as a CCD (Charge Coupled Device), a lens, a lens driving unit, and the like.

The image display unit 102 displays an image indicated by an output image signal which is output from the control device 100. The image display unit 102 is a liquid crystal display, for example. The image display unit 102 may include a touch panel function. A touch panel is a device which senses a touch on a picture or a region which is displayed on a display screen and outputs the touch as an information signal to the outside. There are touch panels of a resistive film type which senses a voltage of an operated position, a capacitance type which catches a change in a capacitance between a fingertip and a conductive film and thereby detects a position, and the like, and an action which corresponds to positional information and an operation on the screen by an operator is performed.

The control unit 103 performs control of a drive of the lens (not illustrated) of the image capturing unit 101, reception of an input signal from input devices (not illustrated) such as a power button and a shutter button, image display on the image display unit 102, and the like. The control unit 103 is realized by execution of a program by hardware such as a CPU (Central Processing Unit) or a GPU (Graphics Processing Unit) which is included in the image capturing apparatus 10.

Figure 2:
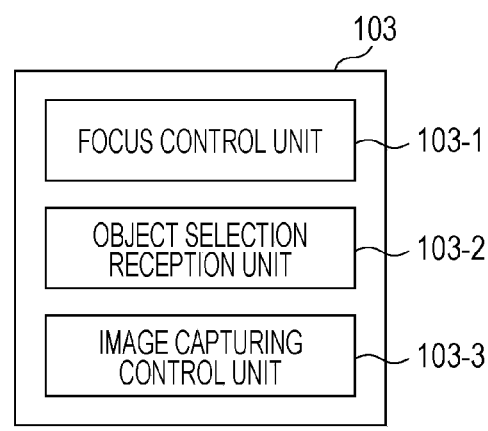
FIG. 2 is a functional block diagram illustrating a configuration example of a control unit.

As illustrated in FIG. 2, the control unit 103 has a focus control unit 103-1 that controls focus, an object selection reception unit 103-2 that receives selection of an object, and an image capturing control unit 103-3 that performs control of image capturing.

Figure 3:
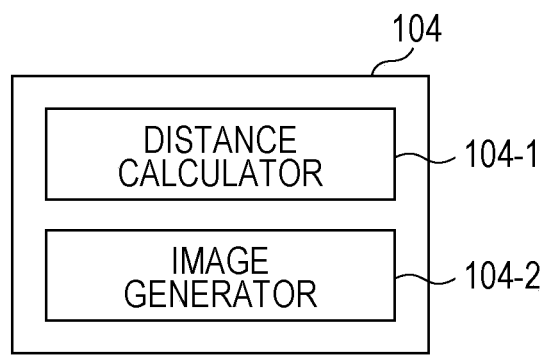
FIG. 3 is a functional block diagram illustrating a configuration example of an image processing unit.

As illustrated in FIG. 3, the image processing unit 104 has a distance calculator 104-1 that calculates a distance, and an image generator 104-2 that performs image generation processing. In the distance calculator 104-1, distance information to an object is calculated from an input image which has been input. In the image generator 104-2, an output image is generated on the basis of the calculated distance information. The image processing unit 104 may be realized by execution of a program by hardware such as an ASIC (Application Specific Integrated Circuit) or an FPGA (Field Programmable Gate Array), a CPU, or a GPU, for example.

As a method of calculating, from an image, a distance to an object, there is a method of calculating distance information from a parallax of a plurality of images whose points of view are different, for example. Examples of a method of calculating the parallax include, as a known technique, a block matching method. The block matching method is a method of evaluating similarity between images, and, when a certain region is selected from one image and a region having the highest similarity to the region is selected from the other image, positional deviation between the region selected from the one image and the region selected from the other image and having the highest similarity is the parallax. In addition, as another method of calculating, from an image, a distance, there is a method of performing calculation from a contrast of a plurality of images whose focus positions are different. For both of the block matching method in which similarity is evaluated and the method of comparing contrasts, it is necessary to set predetermined regions (distance calculation regions) for comparing a plurality of images and calculating distance information. In a case where a parallax between images is calculated, parallax calculation regions are set as the distance calculation regions, and, in a case where comparison of contrasts is performed between images, contrast calculation regions are set as the distance calculation regions.

As described above, as the method of calculating, from a plurality of images whose photographing conditions are different, a distance to an object, there are the method using a parallax, the method performing comparison of contrasts, and the like, and description will be hereinafter given by taking an example of a method by which a distance to an object is calculated from contrasts of a plurality of images which are obtained by photographing while changing a focus position.

Moreover, examples of an image with a shallow depth of field include an image in which an object in a close view is in focus and an object in a background is blurred (hereinafter, referred to as "background blurring"), an image in which an object in a distant view is in focus and an object in a close view is blurred, and an image in which an object in a middle view is in focus and objects in a close view and a distant view are blurred. Description will be given below by taking an example of a method of generating an image of background blurring by image processing.

Figure 4B:
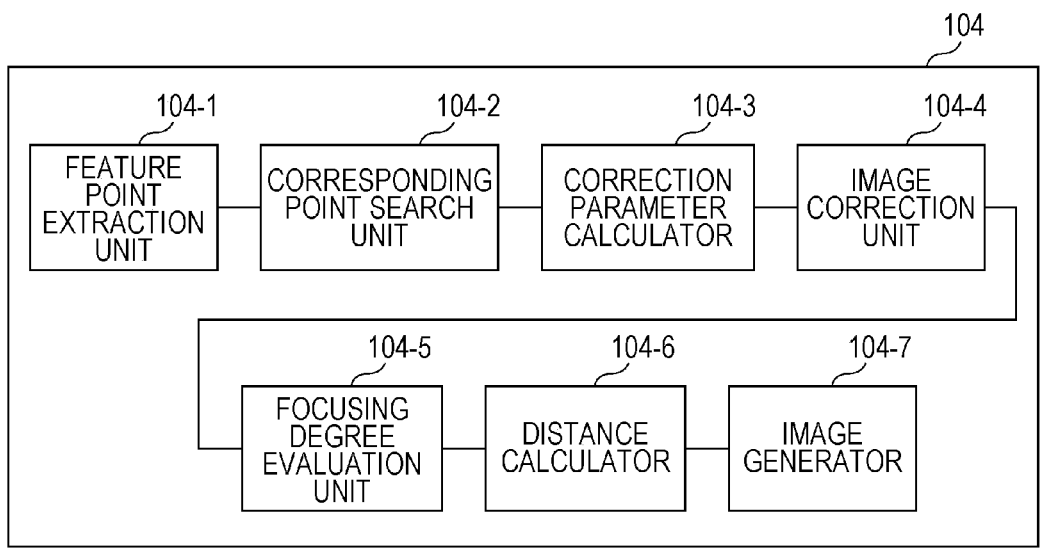
FIG. 4B is a functional block diagram illustrating a configuration example of the image processing unit.

FIG. 4A is a flowchart illustrating a flow of image processing of generating an image with a shallow depth of field from a plurality of images, which are captured at different focus positions, in the present embodiment. FIG. 4B is a functional block diagram illustrating a configuration example of the image processing unit 104, which is along the flow of the processing of FIG. 4A. As illustrated in FIG. 4B, the image processing unit 104 has a feature point extraction unit 104-1, a corresponding point search unit 104-2, a correction parameter calculator 104-3, an image correction unit 104-4, a focusing degree evaluation unit 104-5, a distance calculator 104-6, and an image generator 104-7.

A plurality of images which are captured by the image capturing unit 101 at different focus positions are input to the image processing unit 104 (S401). Next, by the feature point extraction unit 104-1, an image for feature point extraction is set from the plurality of images and a feature point is extracted (S402). After the feature point is extracted, the corresponding point search unit 104-2 searches for corresponding points which correspond to the feature point, which has been extracted at S402, from images other than the image from which the feature point has been extracted (S403). After the corresponding points are searched for, the correction parameter calculator 104-3 calculates a rotation amount, a translation amount, or an enlargement or reduction ratio according to a change in the focus position between the plurality of images from a positional relation of the feature point and the corresponding points, and calculates a correction parameter with which the corresponding positions between the plurality of images are matched (S404). After the correction parameter is calculated, so that, with an image serving as a reference at a time of composition, the other images are matched, the image correction unit 104-4 corrects the other images (S405). After the correction is performed so that the corresponding positions in the respective images are matched, the focusing degree evaluation unit 104-5 evaluates focusing degrees of the respective images (S406). Then, the distance calculator 104-6 calculates, for each region of the images, a distance to an object on the basis of the focusing degrees of the respective images (S407). After the distance is calculated, the image generator 104-7 generates an image with a shallow depth of field by blurring the image on the basis of the distance (S408).

Next, processing at S406, S407, and S408 will be described in detail.

At S406, each of the focusing degrees is evaluated from a contrast of the images. The contrast is able to be calculated from a difference in pixel values between adjacent pixels in a predetermined region having a target pixel as the center thereof. When focus is not on and an image has a blur, a difference in pixel values of adjacent pixels becomes small by being smoothed by the blur, and a contrast is reduced. Thus, it is possible to determine that the greater a difference in pixel values of adjacent pixels is and the higher a contrast is, the more focus is on. As pixel values used for the calculation of the contrast, Y values may be used, for example. By using a Y value, it is possible to reduce a processing amount compared to a case of using three colors of RGB. In a case where image data to be input is RGB, a Y value may be calculated from a formula (1) below, for example.

$$Y = 0.299 \times R + 0.587 \times G + 0.114 \times B \quad (1)$$

In addition, the contrast may be calculated not only from the Y values but also from a plurality of values such as YUV values and RGB values. In a case of using the YUV values or the RGB values, when regions which have the same brightness and different colors are adjacent, it is possible to detect a contrast of color components, which is not able to be detected with brightness components, so that accuracy of distance calculation is improved.

FIG. 5(A) illustrates an image which is obtained by photographing an object 501 (in the figure, a tree) in a close view and an object 502 (in the figure, a building) in a distant view, and which is captured with the object 501 in the close view in focus. A region 503 indicated in the image illustrates a region for calculating a contrast, and the object 501 in the close view is taken in the center thereof. FIG. 5(B) is an enlarged view of the region 503, and FIGS. 5(C) and (D) respectively illustrate enlarged views of positions corresponding to the region 503 in a case where photographing is performed with a focus position set at a middle view and the distant view. Each contrast of the images which are respectively captured with the close view, the middle view, and the distant view in focus as illustrated in FIGS. 5(B), (C), and (D) is calculated.

Next, at S407, the distance to the object is calculated by comparing the contrasts (focusing degrees) calculated at S406. For example, in a case where focusing degrees of FIGS. 5(B), (C), and (D) are set as CONT_N, CONT_M, and CONT_F, respectively, when CONT_N>CONT_M and CONT_N>CONT_F are satisfied, the focusing degree of the image captured with the close view in focus is the highest, so that it is possible to estimate that the distance to the object is a distance to the close view.

Similarly, when CONT_F>CONT_N and CONT_F>CONT_M are satisfied, it is possible to estimate that the distance to the object is a distance to the distant view, and when CONT_M>CONT_N and CONT_M>CONT_F are satisfied, it is possible to estimate that the distance to the object is a distance to the middle view.

Moreover, when CONT_N=CONT_M and CONT_N>CONT_F are satisfied, it is possible to estimate that the distance to the object is a distance to a middle position between the close view and the middle view.

In addition, in a case where all of CONT_N, CONT_M, and CONT_F are small values or zero, there is a high possibility that a region has no feature and is flat, since a contrast is low even when photographing is performed by focusing thereon. Processing for a pixel which is judged to be in a flat region will be described below. Here, description will be given for a relation between a size of a contrast calculation region and a distance to be calculated.

Figure 5:
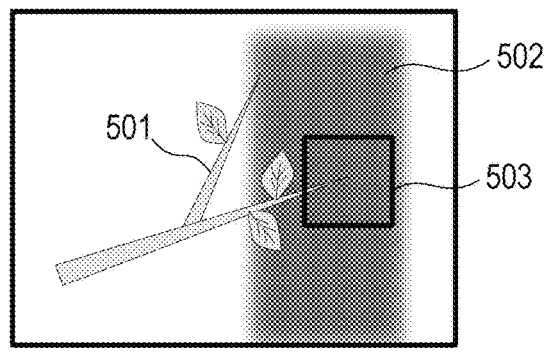
FIG. 5(A) is an image obtained by photographing an object in a close view and an object in a distant view.
FIG. 5(B) is an enlarged view of a region 503 illustrated in the image, and FIGS. 5(C) and (D) respectively illustrate enlarged views of positions corresponding to the region, which is illustrated in the image, in a case where photographing is performed with a focus position set at a middle view and the distant view.
Figure 5:
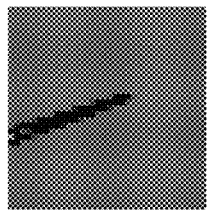
Figure 5:
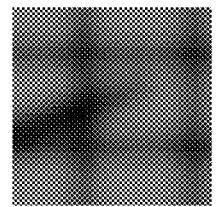
Figure 5:
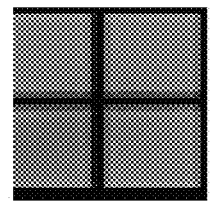

In the region 503 illustrated in FIG. 5, the object 501 in the close view is taken in the center thereof, that is, the region 503 is a region which is not blurred when a background blurred image is generated. Thus, in order to perform suitable background blurring, it is desired that the region 503 is judged as the close view. However, since an object that the region 503 mainly includes is the object 502 in the distant view, when the enlarged views of parts corresponding to the region 503, which are illustrated in FIGS. 5(B), (C), and (D), are compared, the contrast of FIG. 5(D) that is the image in which the distant view is in focus is the highest. Accordingly, when a region for which a contrast is calculated is set to be large in a region in which an object in a close view and an object in a distant view are adjacent, there is a possibility to erroneously calculate a distance.

Then, in the present embodiment, a plurality of contrast calculation regions sizes of which are different are set to thereby reduce erroneous calculation of a distance in a region in which an object in a close view and an object in a distant view are adjacent. In the present embodiment, two contrast calculation regions sizes of which are different are set. In order to discriminate between the two contrast calculation regions, it is set that the smaller contrast calculation region is a first region and the larger contrast calculation region is a second region. First, a case where a contrast is calculated from the first region will be described.

Figure 6:
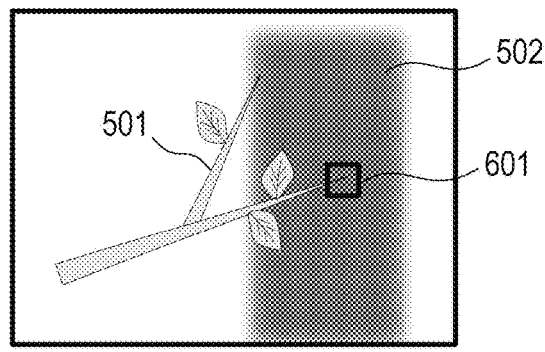
FIG. 6(A) is an image obtained by photographing an object in a close view and an object in a distant view similarly to FIG. 5(A)
FIG. 6(B) is an enlarged view of a region 601 set to be small, and FIGS. 6(C) and (D) respectively illustrate enlarged views of positions corresponding to the region, which is set to be small, in a case where photographing is performed with a focus position set at a middle view and the distant view.
Figure 6:
Figure 6:
Figure 6:

Similarly to FIG. 5(A), FIG. 6(A) illustrates an image which is obtained by photographing the object 501 (tree) in the close view and the object 502 (building) in the distant view, and which is captured with the object 501 in the close view in focus. Moreover, a region 601 indicated in the image illustrates a contrast calculation region, and the object 501 in the close view is taken in the center thereof. The region 601 is set to be smaller than the region 503 illustrated in FIG. 5. FIG. 6(B) is an enlarged view of the region 601, and FIGS. 6(C) and (D) illustrate enlarged views of positions corresponding to the region 601 in a case where photographing is performed with a focus position set at a middle view and the distant view, respectively. When FIGS. 6(B), (C), and (D) are compared, a contrast of FIG. 6(B) that is an image in which the close view is in focus is the highest. As illustrated in FIG. 6, by setting the contrast calculation region to be small, it is possible to reduce erroneous calculation of a distance. However, in a case of setting the contrast calculation region to be extremely small, there is a possibility that a contrast required for calculating a distance is not able to be obtained sufficiently, and there is a possibility that an error of positioning of images at S405 is caused, so that the contrast calculation region is appropriately set so as not to be extremely small. For example, the contrast calculation region may be set to be approximately 1% of vertical resolution or horizontal resolution of an image.

Next, a case where a contrast is calculated from the second region will be described. FIG. 7(A) illustrates an image captured with an object 701 in a distant view in focus, and a region 702 and a region 703 indicate a first region and a second region, respectively. The second region 703 includes, in the region thereof, the object 701 in the distant view, so that a position indicated by a distance calculated from the contrast of the second region is in the distant view. On the other hand, the first region 702 does not include, in the region thereof, the object 701 in the distant view, and is therefore judged to be a flat region. FIG. 7(B) indicates a distance calculated from a contrast of the first region, and a part 701*a* indicated with slanting lines illustrates a region judged to be the distant view. Moreover, the other region illustrates a region judged to be the flat region. Similarly, FIG. 7(C) indicates the distance calculated from the contrast of the second region. Compared with a case where the distance is calculated from the contrast of the first region, in a case where the distance is calculated from the contrast of the second region, a region judged to be the distant view is increased and a region judged to be the flat region is reduced.

Figure 7:
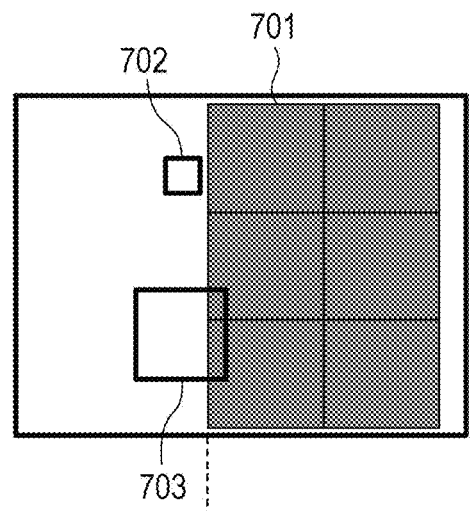
FIG. 7(A) illustrates an image obtained by photographing with an object in a distant view in focus.
FIG. 7(B) illustrates a distance calculated from a contrast of a first region.
FIG. 7(C) is a view illustrating a distance calculated from a contrast of a second region.
Figure 7:
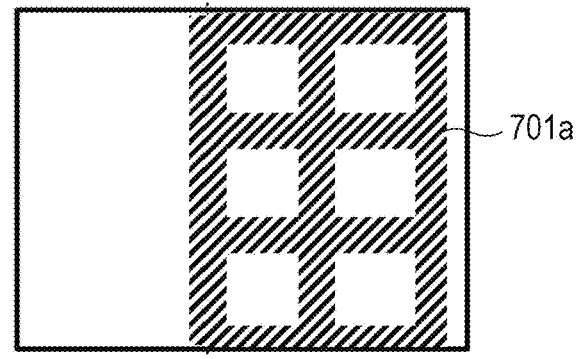
Figure 7:
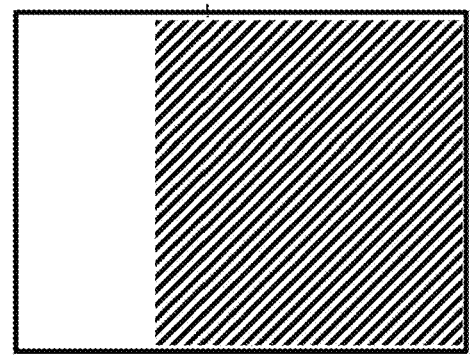
Figure 8:
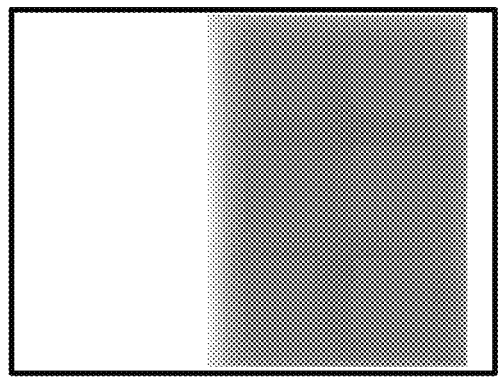
FIG. 8(A) illustrates an image obtained by blurring a background of FIG. 7(A) on the basis of the distance illustrated in FIG. 7(B)
FIG. 8(B) is a view illustrating an image obtained by blurring the background of FIG. 7(A) on the basis of the distance illustrated in FIG. 7(C).
Figure 8:
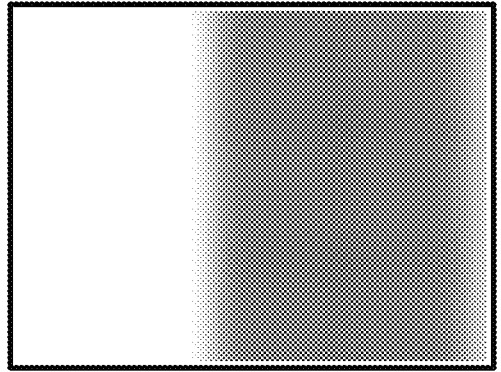

FIG. 8(A) illustrates an image obtained by blurring a background of FIG. 7(A) on the basis of the distance indicated in FIG. 7(B), and FIG. 8(B) illustrates an image obtained by blurring the background of FIG. 7(A) on the basis of the distance indicated in FIG. 7(C). Note that, in both of FIGS. 8(A) and (B), a pixel value of FIG. 7(A) which is an original image is used as it is for a pixel judged to be that of the flat region. Examples of a processing method of a pixel judged as that of the flat region include a method of slightly blurring, a method of greatly blurring similarly to the background, and the like in addition to a method of using the pixel of the original image as it is as illustrated in FIG. 8, and description thereof will be given below in detail.

When FIGS. 8(A) and (B) are compared, while a blur is naturally spread in FIG. 8(B), a blur is not spread sufficiently in FIG. 8(A) since a region judged to be a distant view is small, and an unnatural edge is generated in a boundary between the flat region and a distant view region, so that deterioration in image quality is caused. In a case where a contrast is calculated from the first region to calculate a distance, erroneous calculation of the distance in a region, for example, in which a close view and a distant view are adjacent is reduced as described above, but a region judged to be a flat region is increased as illustrated in FIG. 7 and FIG. 8.

Then, in the present embodiment, when judgment of a flat region is made from a contrast of a first region, blurring processing is performed on the basis of a distance calculated from a contrast of a second region.

By performing blurring processing on the basis of distances calculated from two contrast calculation regions which are large and small, it is possible to reduce erroneous calculation of a distance of a region, for example, in which a close view and a distant view are adjacent, and furthermore to generate a background blurred image in which a blur is suitably spread. In a case where both of the first region and the second region are judged to be flat regions, processing for a flat region is applied.

Next, a method of the image generation at S408 will be described. At S408, a background blurred image is generated on the basis of the distance calculated at S407. A pixel value of each pixel of the background blurred image is able to be calculated by smoothing a captured image. For example, by enlarging a filter size of smoothing (region to be smoothed) as the calculated distance is longer, a blur degree becomes higher as the distance is longer, so that it is possible to generate a suitable background blurred image. In a case where a shape of the region to be smoothed is set to have, for example, a round shape, a blur is spread in a round shape, and, in a case where it is set to have a polygonal shape, a blur is spread in a polygonal shape. Thus, the shape of the region to be smoothed may be set in accordance with a desired blur shape. On the other hand, a pixel in which a position indicated by the calculated distance is in a close view does not need to be blurred, so that a pixel value of an original image may be used as it is as a pixel value of the background blurred image. Next, processing for a pixel judged to be in a flat region will be described. Even when a pixel which is judged to be in a flat region in both of the first region and the second region is smoothed, a pixel value thereof is not greatly changed from that of the original image, since almost the whole of an inside of the second region is flat and pixel values of a center pixel and peripheral pixels are not greatly different. However, when the pixel value of the original image is used as it is without being smoothed, a minute change due to noise included in the original image or the like becomes great compared with a case of being smoothed, so that a difference in amounts of a minute change is generated in a boundary between a region which is judged to be the distant view and smoothed and a region which is judged to be the flat region and for which a pixel value of the original image is used as it is, and there is therefore a possibility that an image becomes unnatural. Accordingly, it is more preferable that smoothing is performed for a pixel which is judged to be in a flat region, compared with a case where a pixel value of an original image is used as it is. On the other hand, when smoothing is performed, there is a possibility that a difference in amounts of a minute change is generated in a boundary between the flat region which is smoothed and a region which is judged to be a close view and for which a pixel value of the original image is used as it is. Then, in order to reduce the differences in both of the boundary between the flat region and the distant view region and the boundary between the flat region and the close view region, it is preferable to set a region to be smoothed, which is used when a pixel value of a pixel judged to be in a flat region is calculated for a background blurred image, to have a small range such as 3×3 pixels or 5×5 pixels.

Figure 4C:
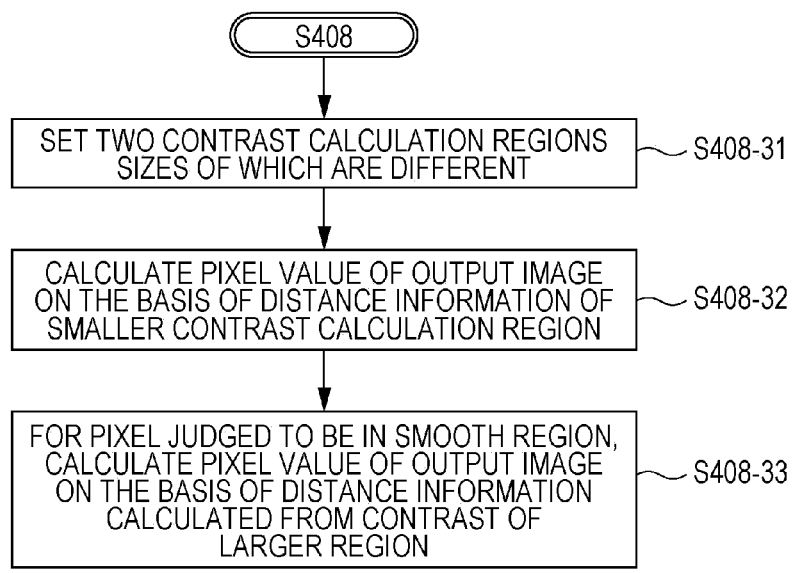
FIG. 4C is a flowchart illustrating an example of image generation processing according to the present embodiment.

FIG. 4C is a flowchart illustrating an example of the image generation processing according to the present embodiment.

As described above, according to the present embodiment, by setting contrast calculation regions sizes of which are different (step S408-31) and calculating a distance from a contrast of a first region which is smaller (step S408-32), it is possible to reduce erroneous calculation of a distance in a region, for example, in which a close view and a distant view are adjacent, and, for a pixel judged to be in a flat region from the contrast of the first region, by blurring an object in a background side on the basis of a distance calculated from a contrast of a second region which is larger than the first region (step S408-33), it is possible to generate a suitable background blurred image with a shallow depth of field.

Moreover, when calculating a pixel value of a background blurred image, by performing smoothing after transforming a pixel value of an original image into a linear space and then by returning the value calculated by smoothing to a space of the original image, it is possible to generate a more suitable background blurred image. For example, it is assumed that the original image is an image of a gamma space obtained by raising a linear space to the power of 0.45, in which the number of bits of the pixel value is 8-bit, the maximum value thereof is 255, and the minimum value thereof is 0. When two pixels one of which has a pixel value of 255 and the other of which has a pixel value of 127 are smoothed upon this condition, a pixel value of 191 is obtained. On the other hand, when transforming the above-described pixel values of the original image into a linear space (8-bit), the respective pixel values become 255 and 54, and when performing smoothing, 155 is obtained. When the pixel value of 155, which is obtained by smoothing of the linear space, is transformed into the original gamma space (8-bit), the pixel value becomes 204. Thus, the calculated pixel values are to be different between the case of performing smoothing after transformation into the linear space and the case of performing smoothing in the gamma space. In a case of blurring by actually photographing, a blur is generated in a linear space, so that, also in a case where blurring processing is performed in image processing, by performing image processing such as smoothing after transformation into a linear space, as described above, it is possible to perform more suitable blurring processing which is close to a blur at a time of photographing.

In addition, by using an image, in which a close view is in focus, as an image to be used as an original image when calculating a pixel value of a background blurred image, it is possible to generate more suitable background blurred image. As described above, in a region in which a close view and a distant view are adjacent, it is difficult to calculate a distance in some cases. For example, in a case where a distance of a pixel which is actually in a distant view is calculated as a close view in a region in which a close view and a distant view are adjacent, a pixel to be blurred is not to be blurred. However, when using an image, in which the close view is in focus, as an image to be used as an original image, an object in the distant view which is not in focus in the original image is blurred, so that it is possible to reduce deterioration in image quality resulting from an erroneous distance. On the contrary, as an original image for a case of generating a foreground blurred image, an image in which a distant view is in focus may be used. Further, in a case of generating an image in which a foreground and a background are blurred, an image in which a middle view is in focus may be used as an original image.

Second Embodiment

Figure 4D:
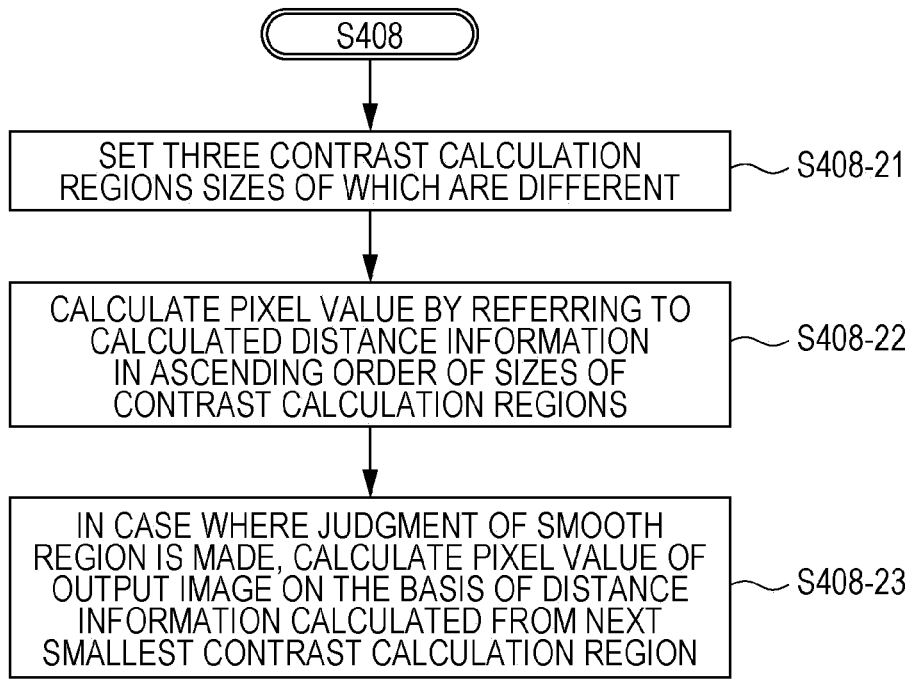
FIG. 4D is a flowchart illustrating an example of image generation processing according to a second embodiment of the invention.

Next, a second embodiment of the invention will be described. In the second embodiment, three or more contrast calculation regions sizes of which are different are set, and thereby a further suitable background blurred image is generated. FIG. 4D is a flowchart illustrating an example of image generation processing according to the present embodiment.

Figure 9:
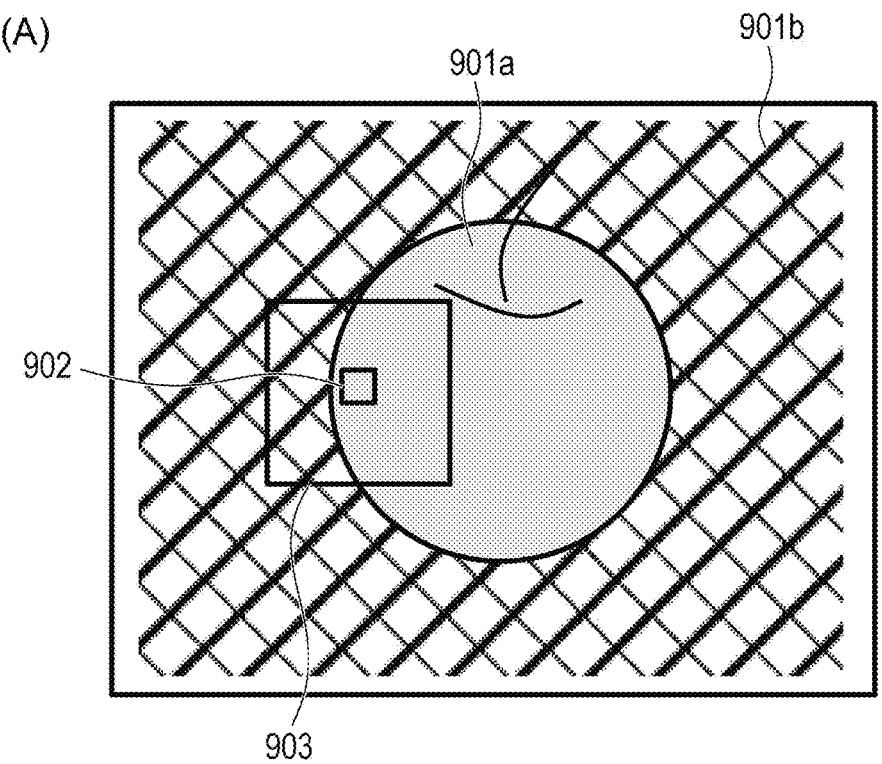
FIG. 9(A) illustrates an object in a close view and an object in a distant view, which is indicated with a lattice.
FIG. 9(B) is a view in which a second region illustrated in FIG. 9(A) is enlarged.
Figure 9:
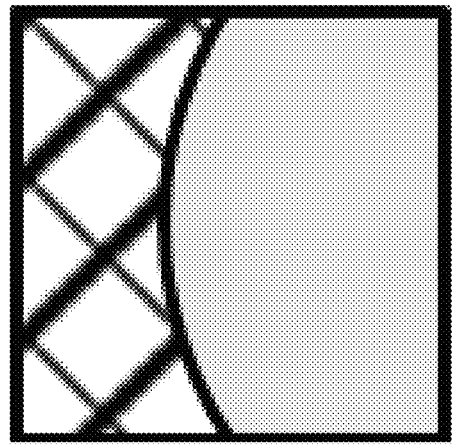

FIG. 9(A) illustrates an object 901a (apple) in a close view and an object 901b in a distant view, which is indicated with a lattice. Moreover, a region 902 indicates a first region and a region 903 indicates a second region. In FIG. 9(A), there is no feature in the first region 902, and judgment of a flat region is made from a contrast of the first region 902, so that blurring processing is performed on the basis of a distance calculated from a contrast of the second region 903. FIG. 9(B) is a view in which the second region 903 illustrated in FIG. 9(A) is enlarged. A center pixel of the second region 903 is the object in the close view, so that it is more preferable that a position indicated by a calculated distance is in the close view. However, in the second region 903, both of the object in the close view and the object in the distant view are included, a feature amount of the object in the close view is small, and a feature amount of the distant view is large, so that there is a possibility that the position indicated by the calculated distance is in the distant view. Then, in the present embodiment, erroneous calculation of a distance is reduced by, as a third region, setting a contrast calculation region which is larger than the first region and smaller than the second region.

Figure 10:
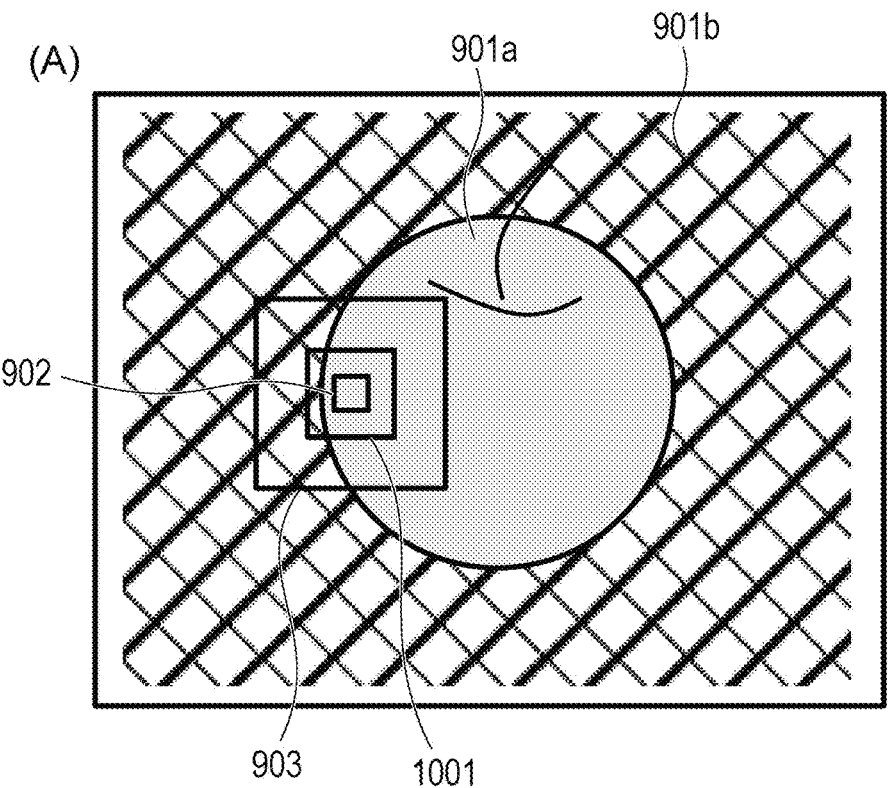
FIG. 10(A) illustrates the object in the close view and the object in the distant view similarly to FIG. 9(A)
FIG. 10(B) is a view in which a third region illustrated in FIG. 10(A) is enlarged.
Figure 10:
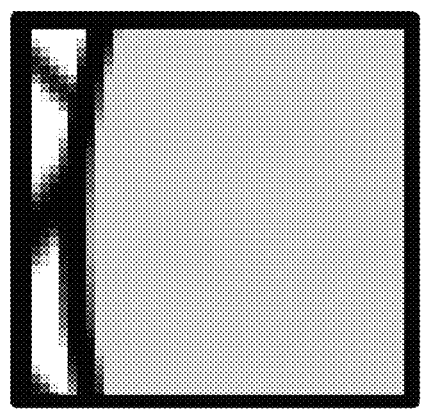

FIG. 10(A) illustrates the object 901a in the close view and the object 901b in the distant view similarly to FIG. 9(A), and a region 1001 is the third region. FIG. 10(B) is a view in which the third region 1001 illustrated in FIG. 10(A) is enlarged.

In the third region 1001, both of the object in the close view and the object in the distant view are included, but the feature amount of the object in the close view is larger than the feature amount of the distant view, so that there is a high possibility that a position indicated by a distance calculated from a contrast of the third region 1001 is in the close view. In the present embodiment, three or more contrast calculation regions sizes of which are different are set (step S408-21), and blurring processing is performed by preferentially referring to a distance calculated from a contrast of a small region (step S408-22). In a case where judgment of a flat region is made from the contrast of the first region which is the smallest, blurring processing is performed on the basis of the distance calculated from the contrast of the third region which is the second smallest, and in a case where judgment of a flat region is made also from the contrast of the third region, blurring processing is performed on the basis of the distance calculated from the contrast of the second region which is further larger. In a case where judgment of a flat region is made also from the contrast of the second region which is the largest, processing for a flat region is applied (step S408-23). As described above, in a case of being enlarged gradually, a contrast calculation region is to mainly include a feature point which is the closest to a center pixel as illustrated in FIG. 10(B), when including the feature point in the contrast calculation region for the first time and having a size allowing calculation of a distance. Therefore, it is possible to reduce erroneous calculation of a distance in a region, for example, in which a close view and a distant view are adjacent.

Figure 11:
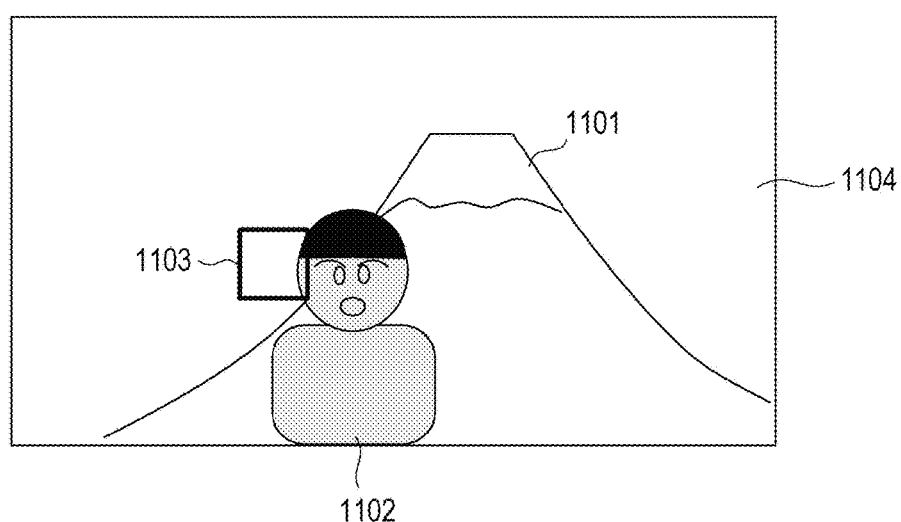
FIG. 11(A) illustrates an object (person) in a close view and an object (mountain) in a distant view, and other regions illustrate an object (sky) in a distant view.
FIG. 11(B) illustrates an enlarged view of a region 1103 of FIG. 11(A).
Figure 11:
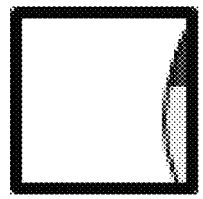

Here, a case where there is a possibility of erroneous calculation of a distance will be described also in the present embodiment. FIG. 11(A) illustrates an object 1102 (person) in a close view and an object 1101 (mountain) in a distant view, and other regions illustrate an object (sky) 1104 in a distant view. A region 1103 indicates a contrast calculation region, and indicates a size including a feature point in the contrast calculation region for the first time among a plurality of contrast calculation regions that are set.

Moreover, FIG. 11(B) illustrates an enlarged view of the region 1103 of FIG. 11(A). Since a center pixel of the region 1103 is the object in the distant view, it is more preferable that a position indicated by a calculated distance is in the distant view. However, a feature amount included in the region 1103 is a feature amount of the object in the close view, so that there is a high possibility that the position indicated by the calculated distance is in the close view. That is, there is a high possibility of erroneous calculation of the distance. However, in a scene, for example, as illustrated in FIG. 11(A), serious deterioration in image quality is not caused even when the distance is erroneously calculated. As described above, in a flat region, pixel values of a center pixel and peripheral pixels are not greatly different, and therefore are not greatly changed from pixel values of an original image even when being smoothed. Accordingly, even when a pixel of the original image is used by judging that the pixel value of the center pixel of the region 1103 is that of the close view, it is possible to obtain a suitable pixel value which is not greatly different from a desired pixel value that is smoothed.

The case where three contrast calculation regions are set has been described above, and by increasing the number of contrast calculation regions, sizes of which are different, to four or five, for example, it is possible to generate a more suitable background blurred image.

Third Embodiment

Figure 4E:
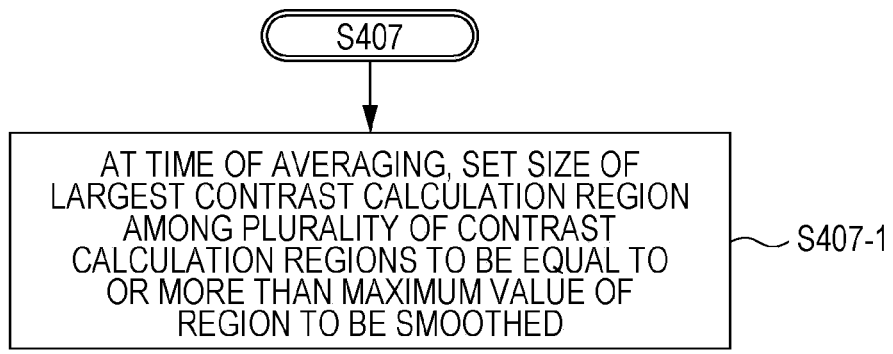
FIG. 4E is a view illustrating a processing example of step S407 according to a third embodiment of the invention.
Figure 12:
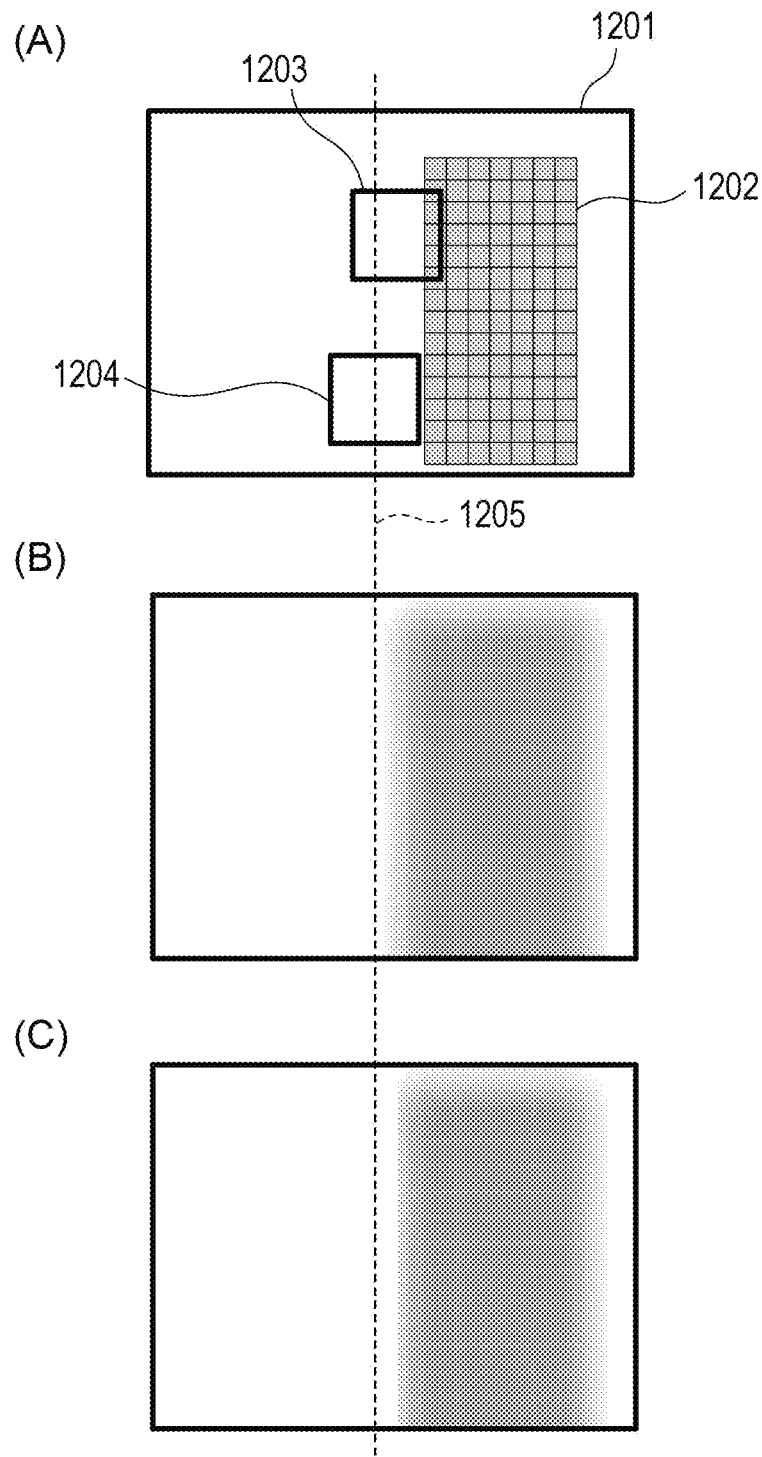
FIG. 12(A) illustrates an image obtained by photographing an object in a distant view.
FIG. 12(B) illustrates an image obtained by blurring the image of FIG. 12(A)
FIG. 12(C) is a view illustrating a blurred image in a case where a contrast calculation region is set to be smaller than a region to be smoothed.

Next, a third embodiment of the invention will be described. In the third embodiment, a further suitable background blurred image is generated by setting sizes of contrast calculation regions by taking a blurring amount of the background blurred image into consideration. FIG. 12(A) illustrates an image 1201 obtained by photographing an object 1202 in a distant view, and a part other than the object 1202 in the distant view is a flat region. In addition, 1203 and 1204 denote regions to be smoothed when a pixel value of the background blurred image is calculated. FIG. 4E is a view illustrating a processing example of step S407 according to the present embodiment. Here, a spread of a blur in a case where the blur is generated by smoothing will be described with use of FIG. 12. Description will be given by taking, as an example of a method of smoothing, a case of smoothing pixels in a square range having a center pixel at the center thereof. In a case where the object 1202 is included in a region as the region to be smoothed 1203, a pixel value which is blurred by smoothing is to be influenced by the object 1202. On the other hand, in a case of not including the object 1202 as the region to be smoothed 1204, a pixel value is not influenced by the object 1202 even when being smoothed. That is, a blur of the object 1202 is spread to a center pixel of the region to be smoothed 1203, but is not spread to a center pixel of the region to be smoothed 1204. FIG. 12(B) illustrates an image obtained by blurring the image 1201 of FIG. 12(A), and a dotted line 1205 in the figure indicates a region to which the blur is spread. As illustrated in FIG. 12(B), it is shown that the spread of the blur of the object 1202 is spread to a boundary between a position including the object 1202 in the region to be smoothed and a position not including the object 1202 in the region to be smoothed. Thus, in order to obtain a blur as illustrated in FIG. 12(B), it is necessary to generate pixels of the background blurred image by setting the distant view as far as a position of the dotted line. In order that the position indicated by the calculated distance is in the distant view, in a case where it is set that, in the image 1201, a pixel on the dotted line is a center pixel, it is necessary to set a contrast calculation region so that the contrast calculation region includes therein the object 1202 in the distant view. That is, when generating a blurred image, a region approximately the same as or larger than a region to be smoothed is set as the contrast calculation region (step S407-1).

On the other hand, FIG. 12(C) illustrates a blurred image in a case where a contrast calculation region is set to be smaller than a region to be smoothed, and, in a case where the contrast calculation region is smaller, a blur is not spread sufficiently and the image becomes unnatural. Note that, in each of FIGS. 12(B) and (C), a pixel value of the image 1201 serving as an original image is used as a pixel value of a flat region. As described above, in the present embodiment, it is possible to generate a background blurred image, in which a blur is suitably spread in a flat region, by setting a size of a contrast calculation region to be equal to or larger than a maximum size of a region to be smoothed when a pixel value of the background blurred image is calculated.

Fourth Embodiment

Figure 4F:
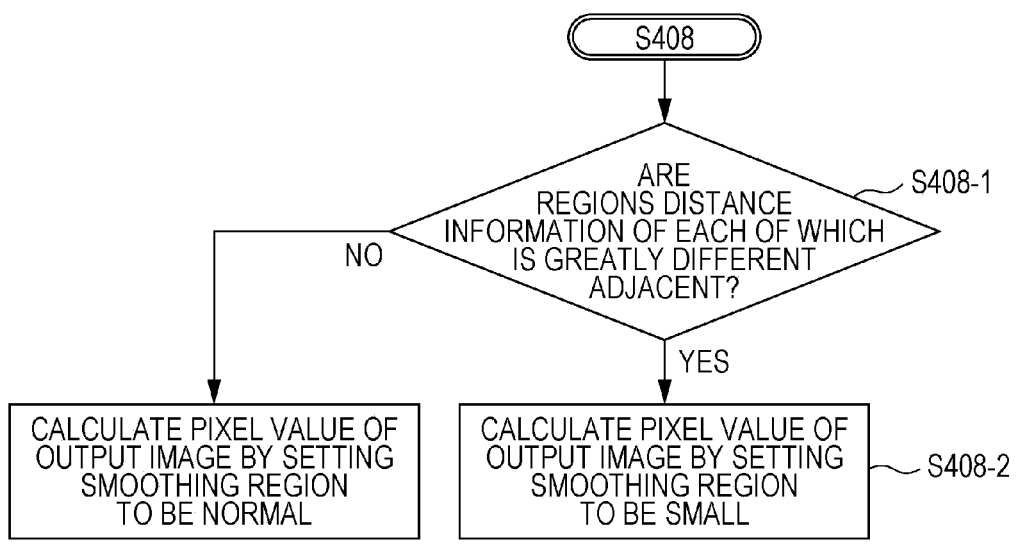
FIG. 4F is a view illustrating an example of step S408 according to a fourth embodiment of the invention.
Figure 4G:
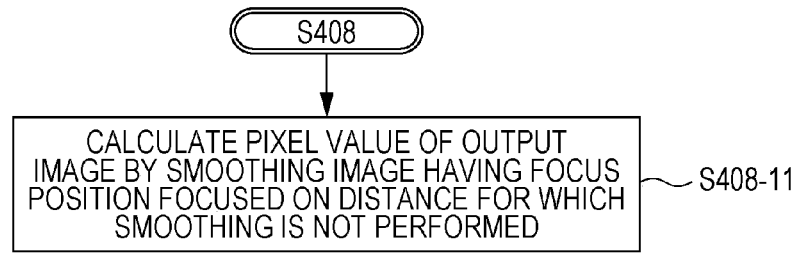
FIG. 4G is a view illustrating another processing example of step S408 according to the fourth embodiment of the invention.

Next, a fourth embodiment of the invention will be described. In the fourth embodiment, a more suitable background blurred image is generated by calculating a pixel value of the background blurred image on the basis of distances calculated from a plurality of contrast calculation regions. In FIG. 4F, a pixel value is calculated by changing setting of a smoothing region in accordance with whether or not regions distance information of each of which is greatly different are adjacent at step S408-1. FIG. 4G is a view illustrating another example of the processing of step S408 according to the present embodiment. At step S408, a pixel value of an output image is calculated by smoothing an image having a focus position focused on a distance, for which smoothing is not performed, among a plurality of input images whose focus positions are different (step S408-11).

FIG. 13(A) illustrates an image obtained by photographing with a close view in focus, and an object 1301a in a close view and an object 1301b in a distant view which is indicated with slanting lines are taken therein. A region 1302 indicates a first region and a region 1303 indicates a second region. Note that, the second region 1303 is set as a region to be smoothed when a pixel value of a maximum blurring amount of a background blurred image is calculated. In FIG. 13(A), the first region 1302 has no feature and is therefore judged to be a flat region, and the second region 1303 includes a feature amount of the object and a position indicated by a distance calculated from a contrast thereof is in a distant view. In addition, FIG. 13(B) corresponds to the second region 1303. In each of small regions obtained by dividing FIG. 13(B) into 25, a distance calculated from a contrast of the first region is indicated, and a region in which "distant" is written, a region in which "close" is written, and a region which is a blank mean regions which are judged to be the distant view, the close view, and the flat region, respectively. Though the position indicated by the distance calculated from the contrast of the second region 1303 is in the distant view, both of a part of the close view and a part of the distant view are included in the region. In a case where, when a pixel value of a background blurred image is calculated, both of an object in a close view and an object in a distant view exist in a region as in FIG. 13(B), when smoothing is performed for all pixels in the region, the pixel value is influenced by the object in the close view. Then, in a case where a pixel value of a blurred image is calculated on the basis of a distance calculated from a contrast of a second region, the influence of the object in the close view is reduced by performing smoothing by taking a distance calculated from a contrast of a first region into consideration. For example, in the case of FIG. 13(B), when smoothing is performed in the second region excluding a part whose distance calculated from the contrast of the first region is the close view, it is possible to reduce the influence of the object in the close view. Further, smoothing may be performed by performing weighting on the basis of a difference between the distance calculated from the contrast of the second region and the distance calculated from the contrast of the first region. For the weighting, as expressed by a formula (2), a weight $W_j$ is defined so as to be smaller as an absolute value $\Delta d_j$ of a difference between a distance d2 calculated from the contrast of the second region and a distance d1 in a pixel j in the second region, which is calculated from the contrast of the first region, is greater, for example.

$$w_j = 1 - \frac{\Delta d_j}{\Delta d_{max}} \qquad (2)$$

In the formula (2), $\Delta d_{max}$ is a maximum value of the absolute value of the difference between the distance calculated from the second region and the distance of the pixel j in the second region. By the formula (2), a weight of a pixel in which the distance calculated from the contrast of the first region is the same as the distance calculated from the contrast of the second region becomes 1, and a weight of a pixel in which the absolute value of the difference between the distance calculated from the contrast of the second region and the distance calculated from the contrast of the first region is the maximum becomes 0. In this manner, the image generator calculates a pixel value of an output image by weighted averaging pixel values on the basis of a plurality of pieces of distance information which are calculated from the plurality of contrast calculation regions.

Figure 13:
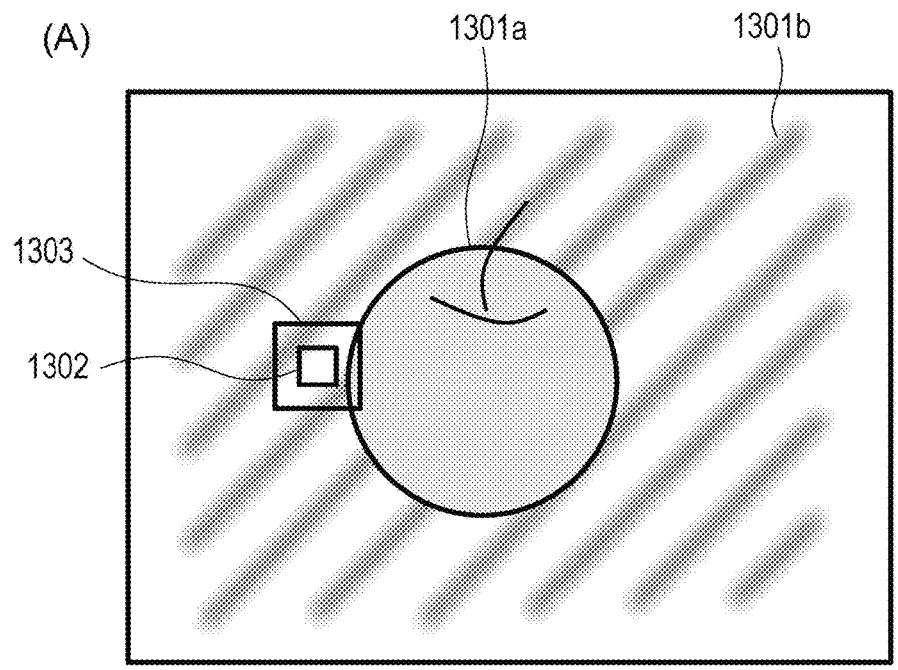
FIG. 13(A) illustrates an image obtained by photographing with a close view in focus.
FIG. 13(B) is a view illustrating a region corresponding to a second region.

Though a case where judgment of a flat region is made from the contrast of the first region has been described in the example illustrated in FIG. 13, when it is possible to calculate a distance from the contrast of the first region, weighting may be performed on the basis of an absolute value of a difference between the distance calculated from the contrast of the first region and a distance of a peripheral pixel, which is calculated from the contrast of the first region. Moreover, for weighting of a pixel in which a distance is not able to be calculated, for example, a weight may be set to be about an intermediate value, or a degree of similarity to a center pixel may be evaluated, and when the degree of similarity is high, the weight may be set to be large, and when the degree of similarity is low, the weight may be set to be small. Further, a value obtained by weighted averaging the distance calculated from the contrast of the first region and the distance calculated from the contrast of the second region may be used as distance information. By setting a weight of the distance calculated from the contrast of the first region to be large, it is possible to set a weight of distance information calculated from image information around a target pixel to be large, and thus it is suitable. Moreover, on the basis of reliability of the calculated distance information, the distance information may be weighted averaged. The reliability is able to be calculated, for example, from a level of a contrast in a contrast calculation region. In a case where the contrast in the contrast calculation region is high, there is a large amount of feature in the contrast calculation region, and reliability of distance information which is calculated on the basis of the large amount of feature becomes high. Accordingly, by weighted averaging a plurality of pieces of calculated distance information on the basis of reliability thereof, it is possible to calculate distance information having high reliability.

Moreover, by changing a size of a region, which is to be smoothed, on the basis of the distance calculated from the contrast of the first region, it is possible to generate a suitable blurred image. FIG. 4F is a view illustrating an example of step S408. In a case where both of a close view and a distant view are included in a second region as FIG. 13(B) (step S408-1), a region to be smoothed when a pixel value of a blurred image is calculated is set to be smaller than that of a case where the close view is not included in the region (step S408-2). By setting the region to be smoothed to be smaller, it is possible to reduce a possibility that the blurred image is influenced by the close view, thus making it possible to realize a suitable blur.

Figure 14:
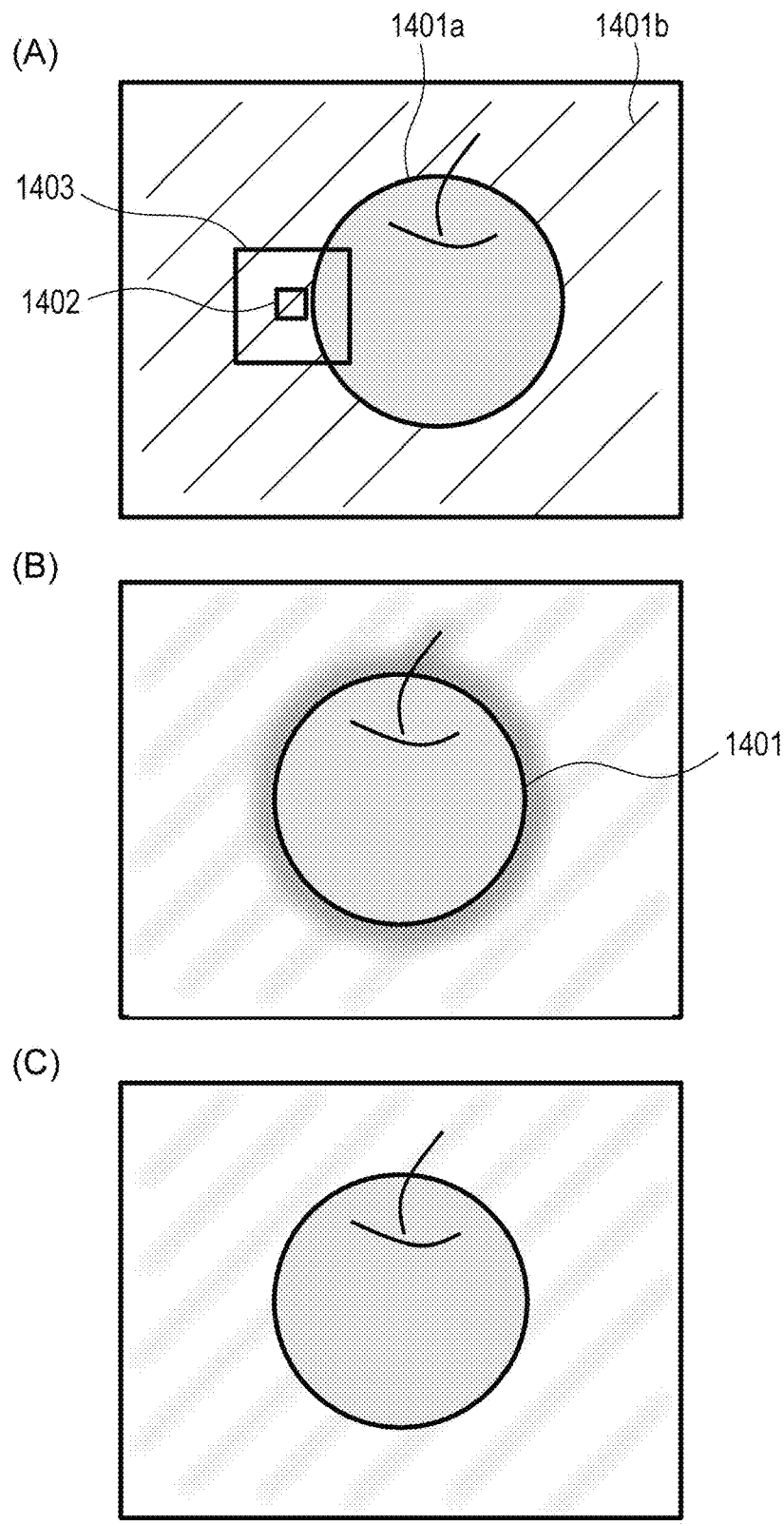
FIG. 14(A) illustrates an image in which an object (apple) in a close view and an object in a distant view, which is indicated with slanting lines, are photographed.
FIG. 14(B) illustrates a background blurred image corresponding to the image of FIG. 14(A)
FIG. 14(C) is a view illustrating a background blurred image of FIG. 14(A), which is obtained by calculating a pixel value by performing smoothing on the basis of a distance corresponding to a pixel in a region to be smoothed.
Figure 15:
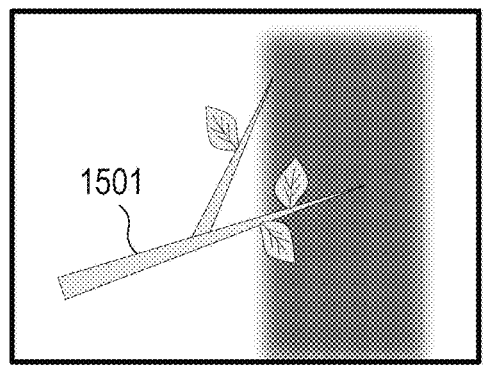
FIGS. 15(A) to 15(C) is a view illustrating a method of calculating a distance to an object for each divided region from intensity of high frequency components of a plurality of images whose focus positions are different.
Figure 15:
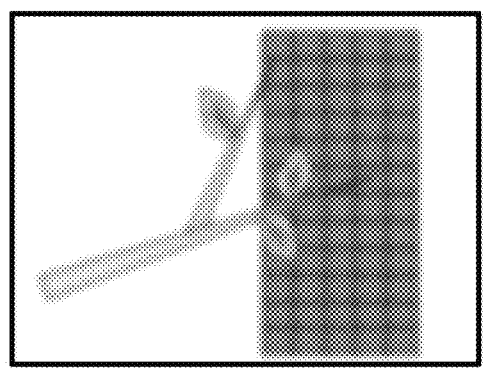
Figure 15:
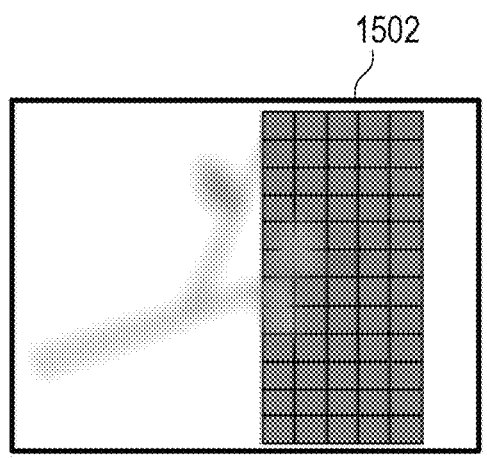
Figure 16:
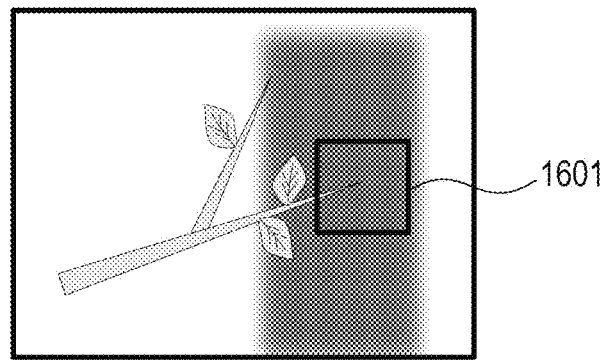
FIG. 16(A) is the same image as FIG. 15(A), and FIGS. 16(B), (C), and (D) are views respectively illustrating enlarged views of positions, which correspond to a region 2301, on three images illustrated in FIG. 15(A) to FIG. 15(C).
Figure 16:
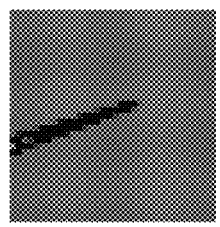
Figure 16:
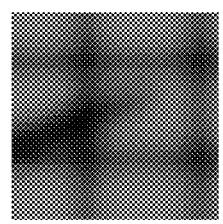
Figure 16:
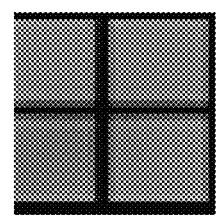
Figure 17:
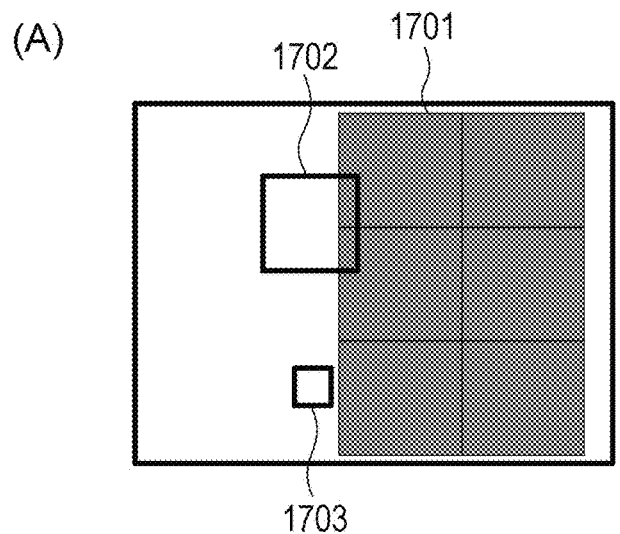
FIG. 17(A) illustrates an image obtained by photographing an object in a distant view.
FIG. 17(B) is a view illustrating expression of a blur in a case where a divided region is set to be large.
FIG. 17(C) is a view illustrating expression of a blur in a case where a divided region is set to be small.
Figure 17:
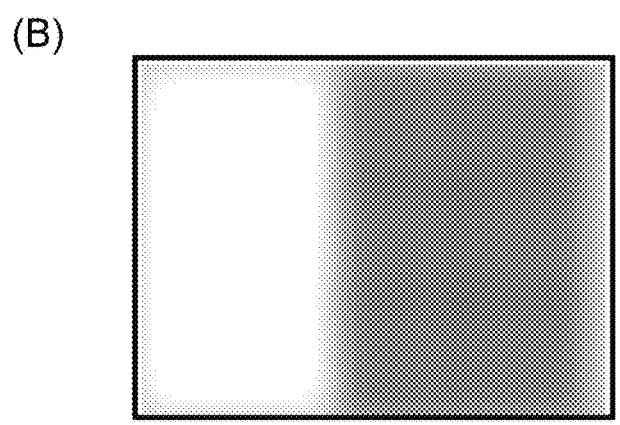
Figure 17:
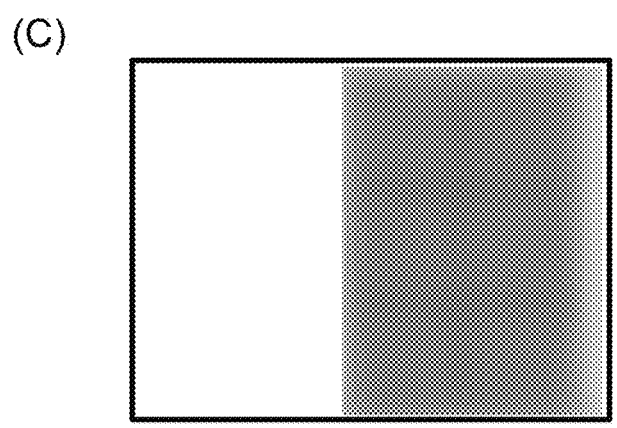

In a case where a position indicated by the distance calculated from the contrast of the first region is in a middle view or a distant view, it is possible to generate a more suitable background blurred image by calculating a pixel value of the background blurred image on the basis of, in addition to the distance calculated from the contrast of the first region, a distance in a peripheral pixel, which is calculated from the contrast of the first region. As described above, in a case where a distance is calculated from a contrast of a first region, a pixel value of a background blurred image is calculated on the basis of the distance. In a case where a position indicated by the calculated distance is in a middle view or a distant view, the pixel value is to be calculated by smoothing a peripheral pixel. FIG. 14(A) illustrates an image in which an object 1401a (apple) in a close view and an object 1401b in a distant view, which is indicated with slanting lines, are taken. A region 1403 indicates a second region, and the region 1403 indicates a region to be smoothed. Since a first region 1402 includes the object in the distant view therein, a position indicated by a distance calculated from a contrast of the first region is to be in the distant view. Accordingly, a pixel value of a background blurred image, which corresponds to a center pixel of the first region 1402, is calculated by smoothing a pixel value in the region to be smoothed 1403. In FIG. 14(A), since the region to be smoothed 1403 also includes the object 1401a in the close view therein, when smoothing is performed, a pixel value which includes an influence of the object in the close view is to be calculated.

FIG. 14(B) illustrates a background blurred image corresponding to the image of FIG. 14(A), and a distant view region around the object 1401a in the close view is influenced by the object 1401a in the close view, so that the image becomes unnatural. Then, in a case where a position indicated by a distance calculated from a contrast of a first region is in a middle view or a close view, a more suitable background blurred image is generated by performing smoothing on the basis of a distance corresponding to a pixel in a region to be smoothed. FIG. 14(C) illustrates a background blurred image of FIG. 14(A), which is obtained by calculating a pixel value by performing smoothing on the basis of a distance corresponding to a pixel in a region to be smoothed, and the distant view region around the object 1401a in the close view is not influenced by the object 1401a in the close view, so that the background blurred image is suitable. For smoothing processing based on a distance corresponding to a pixel in a region to be smoothed, for example, in a case where a distance of a center pixel indicates a distant view, smoothing may be performed excluding a case where a distance of the pixel in the region to be smoothed indicates a close view, or weighting and smoothing may be performed on the basis of a difference between the distance of the center pixel and the distance of the pixel in the region to be smoothed so that a weight of a pixel whose distance is shorter becomes great. In a case where, in a pixel in a region to be smoothed, judgment of a flat region is made from a contrast of a first region, a distance calculated from a contrast of the next smallest contrast calculation region may be referred to. Moreover, in a case where, in the pixel in the region to be smoothed, judgment of a flat region is made in all of a plurality of contrast calculation regions, there is no feature between a center pixel and a peripheral pixel thereof, and there is a high possibility that an object is positioned at the same distance as that of the center pixel, so that smoothing may be performed.

Though a case where an image with a shallow depth of field is generated by using a plurality of images, which are obtained by photographing while changing a focus position, for input images and blurring an object in a background has been mainly described in the above-described embodiments, a similar effect is able to be achieved even in a case where input images are a plurality of images whose points of view are different. Moreover, in addition to a case where a background is blurred, the invention is able to be applied to processing of blurring a foreground, or blurring a foreground and a background, for example.

According to each embodiment of the invention, it is possible to generate an image with a shallow depth of field with composition.

The processing and the control are able to be realized by software processing by a CPU or a GPU or by hardware processing by an ASIC or an FPGA.

In the aforementioned embodiments, the configurations and the like illustrated in the attached drawings are not limited thereto, and may be modified as appropriate within the scope where the effects of the invention is obtained. Additionally, the invention is able to be practiced with appropriate modifications without departing from the scope of objects of the invention.

Moreover, any selection can be made optionally from each component of the invention, and an invention which includes the selected configuration is also included in the invention.

Further, a program for realizing functions which have been described in the embodiments may be recorded in a computer-readable recording medium, the program which is recorded in the recording medium may be read and executed by a computer system, and processing of each unit may thereby be performed. Note that, the "computer system" herein includes an OS and hardware such as peripheral equipment.

In addition, the "computer system" includes a homepage providing environment (or display environment) in a case where the WWW system is used.

(Additional Notes)

(1)

An image processing device, including: a distance calculator that calculates distance information corresponding to at least one image among a plurality of input images; and an image generator that generates an output image with a shallow depth of field based on the distance information, in which the distance calculator calculates distance information from a plurality of contrast calculation regions sizes of which are different, and the image generator calculates a pixel value of an output image by smoothing a pixel value of the input image based on the distance information.

(2)

The image processing device according to (1), in which the image generator calculates the pixel value of the output image based on distance information calculated from a smallest contrast calculation region among pieces of distance information calculated from the plurality of contrast calculation regions, and calculates the pixel value of the output image based on distance information calculated from a contrast calculation region that is larger than the smallest contrast calculation region, in a case where the smallest contrast calculation region is judged to be a flat region.

In a case where judgment of a flat region is made from a contrast of a first region that is smaller, blurring processing is performed on the basis of a distance calculated from a contrast of a second region that is larger.

By performing blurring processing on the basis of distances calculated from two contrast calculation regions which are large and small, it is possible to reduce erroneous calculation of a distance of a region, for example, in which a close view and a distant view are adjacent, and furthermore to generate a background blurred image in which a blur is suitably spread. In a case where both of the first region and the second region are judged to be flat regions, processing for a flat region is applied.

(3)

The image processing device according to (1) or (2), in which the image generator, in a case of calculating the pixel value of the output image, performs smoothing after transforming a pixel value of an original image into a linear space, and returns the value calculated by the smoothing to a space of the original image.

Thereby, it is possible to generate a more suitable background blurred image.

(4)

The image processing device according to (1) or (2), in which the image generator uses an image, in which a close view is in focus, as an original image in a case of calculating a pixel value of an output image in which a background is blurred, uses an image, in which a distant view is in focus, as an original image in a case of generating an output image in which a foreground is blurred, and uses an image, in which a middle view is in focus, as an original image in a case of generating an output image in which a foreground and a background are blurred.

Thereby, it is possible to generate a suitable blurred image.

It is difficult to calculate a distance in a region in which a close view and a distant view are adjacent, in some cases. For example, in a case where a distance of a pixel which is actually in a distant view is calculated as a close view in a region in which a close view and a distant view are adjacent, a pixel to be blurred is not to be blurred. However, when using an image, in which the close view is in focus, as an image to be used as an original image, an object in the distant view which is not in focus in the original image is blurred, so that it is possible to reduce deterioration in image quality resulting from an erroneous distance.

(5)

The image processing device according to (1) or (2), in which the distance calculator calculates distance information from at least three of the contrast calculation regions sizes of which are different, and the image generator calculates the pixel value of the output image by referring to the distance information calculated from each of the contrast calculation regions in an ascending order of the sizes of the contrast calculation regions.

(6)

The image processing device according to (5), in which in a case where the contrast calculation region referred to is judged to be a flat region, the pixel value of the output image is calculated based on distance information calculated from a contrast calculation region that is smallest next to the contrast calculation region referred to.

(7)

The image processing device according to any one of (1) to (6), in which the image generator calculates the pixel value of the output image by weighted averaging pixel values based on a plurality of pieces of distance information calculated from the plurality of contrast calculation regions.

(8)

The image processing device according to any one of (1) to (6), in which the image generator calculates the pixel value of the output image based on distance information calculated by weighted averaging a plurality of pieces of distance information calculated from the plurality of contrast calculation regions.

(9)

The image processing device according to any one of (1) to (6), in which the image generator calculates the pixel value of the output image based on distance information obtained by weighted averaging a plurality of pieces of distance information calculated from the plurality of contrast calculation regions, based on reliability thereof.

(10)

The image processing device according to (1), in which the distance calculator sets a size of a contrast calculation region that is largest among the plurality of contrast calculation regions to be equal to or larger than a size of a maximum smoothing region that is a largest region to be smoothed in the smoothing by the image generator.

(11)

The image processing device according to (1), in which
the image generator
calculates the pixel value of the output image by setting a smoothing region to be small, in a case where regions are adjacent distance information of each of which is greatly different.

(12)

The image processing device according to (1), in which
in a case where the plurality of input images are a plurality of images focus positions of which are different,
the image generator
calculates the pixel value of the output image by smoothing an image having a focus position focused on a distance, for which smoothing is not performed, among the plurality of input images.

(13)

A program that causes a computer to execute an image processing method, the method including: a distance calculation step of calculating distance information corresponding to at least one image among a plurality of input images; and an image generation step of generating an output image with a shallow depth of field based on the distance information, in which
at the distance calculation step, distance information is calculated from a plurality of contrast calculation regions sizes of which are different, and
at the image generation step, a pixel value of an output image is calculated by smoothing a pixel value of the input image based on the distance information.

INDUSTRIAL APPLICABILITY

The invention is able to be used for an image processing device.

REFERENCE SIGNS LIST 10 image capturing apparatus
100 control device
101 image capturing unit
102 image display unit
103-1 focus control unit
103-2 object selection reception unit
103-3 image capturing control unit
104-1 feature point extraction unit
104-2 corresponding point search unit
104-3 correction parameter calculator
104-4 image correction unit
104-5 focusing degree evaluation unit
104-6 distance calculator
104-7 image generator All publications, patents and patent applications cited in this specification are incorporated herein by reference in their entirety.

The invention claimed is:

1. An image processing apparatus, comprising:
distance calculation circuitry that calculates distance information corresponding to at least one image; and
image generation circuitry that generates an output image with a shallow depth of field based on the distance information, wherein
the distance calculation circuitry calculates distance information of a target pixel using at least one contrast calculation region among a plurality of contrast calculation regions sizes of which are different,
each of the plurality of contrast calculation regions includes the target pixel, and
the image generation circuitry calculates a pixel value of an output image by smoothing a pixel value of the input image based on the distance information.

2. The image processing apparatus according to claim 1, wherein
the image generation circuitry
calculates the pixel value of the output image based on distance information calculated from a smallest contrast calculation region among the plurality of contrast calculation regions, in a case where the smallest contrast calculation region is judged to be not a flat region, and
calculates the pixel value of the output image based on distance information calculated from a contrast calculation region that is larger than the smallest contrast calculation region, in a case where the smallest contrast calculation region is judged to be a flat region.

3. The image processing apparatus according to claim 1, wherein
the image generation circuitry,
in a case of calculating the pixel value of the output image, performs smoothing after transforming a pixel value of an original image into a linear space, and returns the value calculated by the smoothing to a space of the original image.

4. The image processing apparatus according to claim 1, wherein
the image generation circuitry
uses an image, in which a close view is in focus, as an original image in a case of calculating a pixel value of an output image in which a background is blurred,
uses an image, in which a distant view is in focus, as an original image in a case of generating an output image in which a foreground is blurred, and
uses an image, in which a middle view is in focus, as an original image in a case of generating an output image in which a foreground and a background are blurred.

5. The image processing apparatus according to claim 1, wherein
the distance calculation circuitry calculates distance information from at least three of the contrast calculation regions sizes of which are different, and
the image generation circuitry calculates the pixel value of the output image by referring to the distance information calculated from each of the contrast calculation regions in an ascending order of the sizes of the contrast calculation regions.

6. The image processing apparatus according to claim 5, wherein
in a case where the contrast calculation region referred to is judged to be a flat region, the pixel value of the output image is calculated based on distance information calculated from a contrast calculation region that is smallest next to the contrast calculation region referred to.

7. The image processing apparatus according to claim 1, wherein
the image generation circuitry
calculates the pixel value of the output image by weighted averaging pixel values based on a plurality of pieces of distance information calculated from the plurality of contrast calculation regions.

8. The image processing apparatus according to claim 1, wherein
the image generation circuitry
calculates the pixel value of the output image based on distance information calculated by weighted averaging a plurality of pieces of distance information calculated from the plurality of contrast calculation regions.

9. The image processing apparatus according to claim 1, wherein the image generation circuitry calculates the pixel value of the output image based on distance information obtained by weighted averaging a plurality of pieces of distance information calculated from the plurality of contrast calculation regions, based on reliability thereof.

10. The image processing apparatus according to claim 1, wherein the distance calculation circuitry sets a size of a contrast calculation region that is largest among the plurality of contrast calculation regions to be equal to or larger than a size of a maximum smoothing region that is a largest region to be smoothed in the smoothing by the image generation circuitry.

11. The image processing apparatus according to claim 1, wherein the image generation circuitry calculates the pixel value of the output image by setting a smoothing region to be small, in a case where regions are adjacent distance information of each of which is greatly different.

12. The image processing apparatus according to claim 1, wherein in a case where the plurality of input images are a plurality of images focus positions of which are different, the image generation circuitry calculates the pixel value of the output image by smoothing an image having a focus position focused on a distance, for which smoothing is not performed, among the plurality of input images.

13. An image capturing apparatus, comprising:

image processing apparatus recited in claim 1; and image capturing circuitry that generates the input image.

14. A non-transitory computer readable medium in which a program causing a computer to function as an image processing apparatus is recorded, the image processing apparatus comprising:

distance calculation circuitry that calculates distance information corresponding to at least one image; and image generation circuitry that generates an output image with a shallow depth of field based on the distance information, wherein the distance calculation circuitry calculates, distance information of a target pixel using at least one contrast calculation region among a plurality of contrast calculation regions sizes of which are different, each of the plurality of contrast calculation regions includes the target pixel, and the image generation circuitry calculates, a pixel value of an output image by smoothing a pixel value of the input image based on the distance information.

\* \* \* \* \*